US012759017B2

(12) United States Patent
Romanetto et al.

(10) Patent No.: US 12,759,017 B2
(45) Date of Patent: Oct. 13, 2026

(54) SYSTEM AND METHOD FOR APPLYING A PROTECTIVE COATING TO A WHEEL HUB UNIT

(71) Applicant: AKTIEBOLAGET SKF, Götenborg (SE)

(72) Inventors: Marco Romanetto, Pianezza (IT); Fausto Morello, Sommariva del Bosco (IT); Piero Ballari, Vigone (IT); Pruthviraj Mandya Shekar, Mandya (IN)

(73) Assignee: AKTIEBOLAGET SKF, Gothenburg (SE)

( * ) Notice: Subject to any disclaimer, the term of this patent is extended or adjusted under 35 U.S.C. 154(b) by 396 days.

(21) Appl. No.: 18/216,262

(22) Filed: Jun. 29, 2023

(65) Prior Publication Data

US 2024/0207879 A1 Jun. 27, 2024

(30) Foreign Application Priority Data

Jul. 13, 2022 (IT) ........................ 102022000014737

(51) Int. Cl.

*B05B 12/32* (2018.01)
*B05B 13/02* (2006.01)
(Continued)

(52) U.S. Cl.

CPC ................ *B05D 1/32* (2013.01); *B05B 12/32* (2018.02); *B05B 13/0228* (2013.01);
(Continued)

(58) Field of Classification Search

CPC . B05B 12/32; B05B 13/0228; B60B 27/0094; B60B 2310/614; B60B 2380/70;
(Continued)

(56) References Cited

U.S. PATENT DOCUMENTS

| | | | | |
|---|---|---|---|---|
| 9,321,308 | B2 | 4/2016 | Baratti et al. | |
| 2015/0115696 | A1* | 4/2015 | Baratti | B60B 27/00 301/109 |
| 2019/0353206 | A1* | 11/2019 | Kitagawa | F16C 33/7886 |

FOREIGN PATENT DOCUMENTS

| | | | | |
|---|---|---|---|---|
| CN | 103962268 A | * 8/2014 | | B05B 12/30 |
| GB | 2240290 B | * 10/1993 | | B05B 12/32 |

(Continued)

OTHER PUBLICATIONS

International Search Report for corresponding Italy Patent Application No. 102022000014737 dated Feb. 7, 2023.

*Primary Examiner* — William P Fletcher, III

(74) *Attorney, Agent, or Firm* — J-TEK LAW PLLC; Scott T. Wakeman; Mark A. Ussai

(57) ABSTRACT

A method for applying a protective coating to a wheel hub unit includes mounting the wheel hub unit on a platform and applying a layer of the protective coating to a front surface of a mounting flange of the wheel hub unit. A shield covers a central annular portion of the front surface of the wheel hub unit to protect the central annular portion from the layer of protective coating, which can damage markings and magnetic components formed on the central annular portion. A handling arm attaches to the shield to hold the shield in place an axial distance away from the central annular portion of the front face.

13 Claims, 4 Drawing Sheets

(51) Int. Cl.
*B05D 1/32* (2006.01)
*B60B 27/00* (2006.01)

(52) U.S. Cl.
CPC .... *B60B 27/0094* (2013.01); *B60B 2310/614* (2013.01); *B60B 2380/70* (2013.01); *B60B 2900/20* (2013.01)

(58) Field of Classification Search
CPC .......... B60B 2900/20; B60B 2310/616; B60B 2900/141; B60B 2900/572; B60B 27/0005; B60B 27/00; B60B 27/001; B60B 27/0052; B60B 27/0057; B60B 2310/00; B60B 2380/12; B60B 2380/14; B05D 1/32
See application file for complete search history.

(56) References Cited

FOREIGN PATENT DOCUMENTS

| | | |
|---|---|---|
| JP | 2021055770 | 4/2021 |
| WO | 2009122855 | 10/2009 |
| WO | 2011152536 | 12/2011 |

* cited by examiner

SYSTEM AND METHOD FOR APPLYING A PROTECTIVE COATING TO A WHEEL HUB UNIT

CROSS-REFERENCE TO RELATED APPLICATIONS

This application is based on and claims priority to Italian Patent Application No. 102022000014737 filed on Jul. 13, 2022, under 35 U.S.C. § 119, the disclosure of which is incorporated herein by reference in its entirety.

FIELD

The present disclosure relates to wheel hub unit for vehicles.

BACKGROUND

Exposed surfaces of a wheel hub are often coated with a protective coating or film to protect them from contaminants, such as water and debris.

Known wheel hub units are often also equipped with markings, such as a QR code, data matrix, etc., and magnetized parts, such as magnetic encoders of ABS devices. During application of the protective layer or film to the wheel hub unit, these markings and magnetized parts may become damaged or obscured if protective coating is provided to them, affecting the readability and operation of these components.

BRIEF DESCRIPTION OF THE DRAWINGS

The disclosure will now be described with reference to the attached drawings, which illustrate non-limiting exemplary embodiments in which.

DETAILED DESCRIPTION

Figure 1:
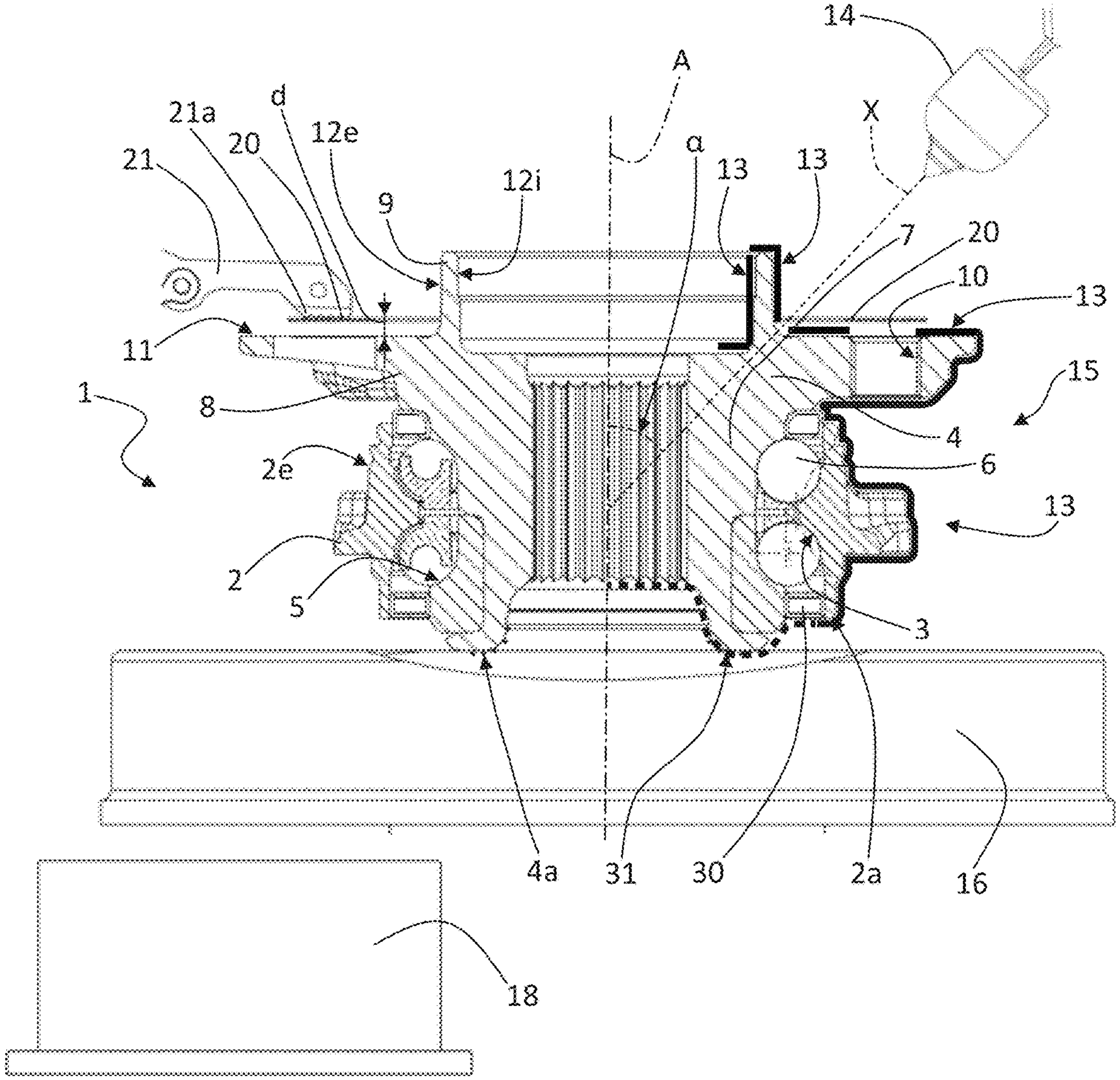
FIG. 1 illustrates a radial cross-section of an apparatus for performing a method of applying a protective coating to a wheel hub unit and the wheel hub unit produced according to exemplary embodiments of the present disclosure.
Figure 2:
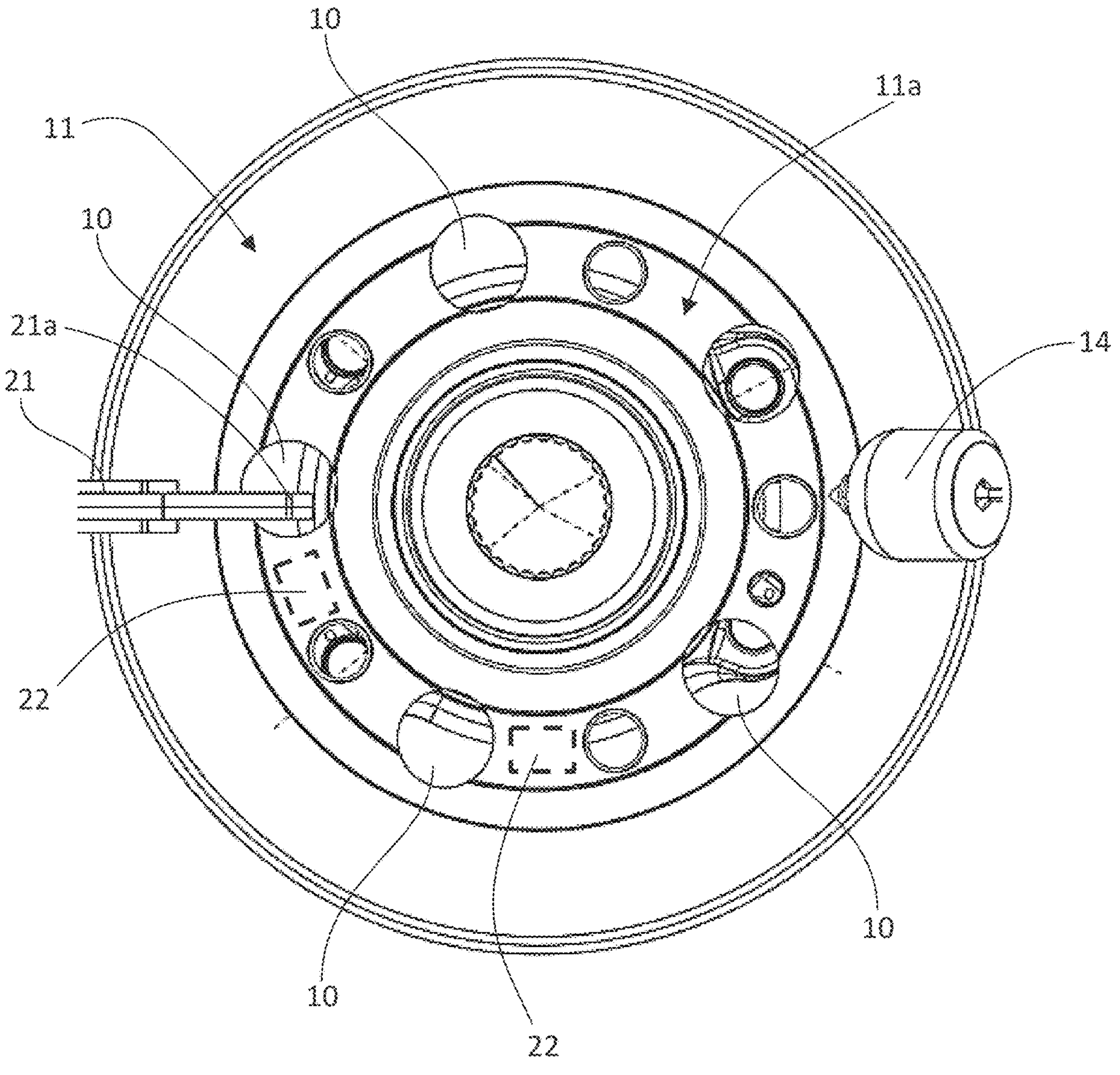
FIG. 2 is a front view of the apparatus and wheel hub unit of FIG. 1 according to exemplary embodiments of the present disclosure.
Figure 3:
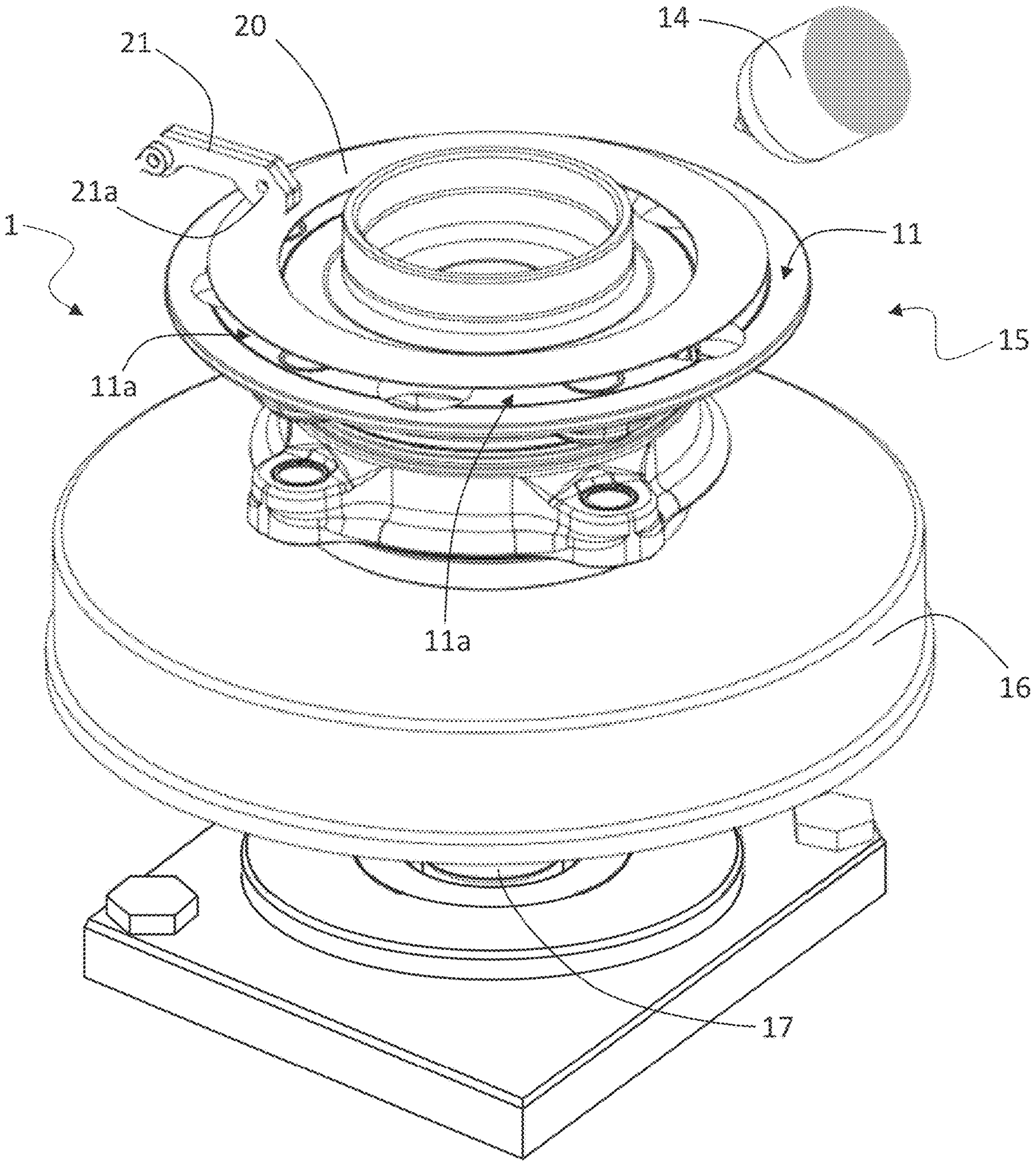
FIG. 3 illustrates an isometric view of the apparatus and wheel hub unit of FIG. 1 according to exemplary embodiments of the present disclosure.

A wheel hub unit may include an outer annular element, such as a radially outer ring, with a raceway provided an a radially inner surface, an inner annular element, such as a radially inner ring, with a raceway provided on a radially outer surface, and a plurality of rolling bodies interposed between the radially outer and inner elements and engaged with the raceways. One of the annular elements rotates about a central axis of rotation of the wheel hub unit and may include a spindle provided on an "outboard" side of the wheel hub unit. The wheel hub unit may include a mounting flange for mounting on a wheel of a vehicle and a collar that protrudes axially from the mounting flange to guide the vehicle wheel onto the mounting flange.

In use, both the collar and the mounting flange are exposed to numerous contaminants, such as water, mud, dust, and sand. During assembly and disassembly, for example to change tires, the collar and the mounting flange may further be subject to chafing. These parts of the wheel hub unit can therefore easily be subject to corrosion, resulting in rust and other effects that deteriorate these components and reduce their operating life.

A protective coating (layer or film), for example, made of photo-polymerizable synthetic material, may be applied to exposed surfaces of the wheel hub unit to protect them from these contaminants and chafing. However, the protective coating can be damaging to other elements present on the wheel hub unit. Certain markings, such as QR codes and data matrices, on the surface of the wheel hub unit may be obfuscated by this protective coating, which can render these markings unreadable. Further, magnetic components of the wheel hub unit may be damaged by this protective coating as well, such as an encoder for an ABS system.

It is therefore necessary to design a solution for wheel hub units described above which protects these markings and magnetized parts from damage caused by the protective coating or film.

With reference to the figures, some embodiments of a wheel hub unit 1 may include an outer annular element 2, such as a radially outer ring 2, a radially inner annular element 4, such as a radially inner ring 4, and a plurality of rolling bodies 6 interposed between radially outer ring 2 and radially inner ring 4. Outer ring 2 may include a plurality of first rolling raceways 3 formed on a radially inner surface of outer ring 2, and inner ring 4 may include a plurality of second rolling raceways 5 formed on a radially outer surface of inner ring 4 and positioned radially opposite first rolling raceways 3. In some embodiments, each rolling body of plurality of rolling bodies 6 engages a respective first rolling raceway 3 and a respective second rolling raceway 5. In some embodiments, plurality of rolling bodies 6 may form two rows of rolling bodies. In some embodiments, rolling bodies 6 may be balls, rollers, needle rollers, or the like.

Throughout this disclosure and in the claims, description of an "outboard" side of wheel hub unit 1 refers to the side of wheel hub unit 1 intended to face toward the outside of a vehicle when assembled on the vehicle. Similarly, description of an "inboard" side of wheel hub unit 1 refers to the side of wheel hub unit 1 that faces the inside of a vehicle when wheel hub unit 1 is assembled on the vehicle.

In some embodiments, inner ring 4 may rotate about an axis of rotation A of wheel hub unit 1 and outer ring 2 may be stationary. In such embodiments, inner ring 4 may include a spindle 7 formed on an outboard side of wheel hub unit 1. Spindle 7 may include a mounting flange 8 for mounting wheel hub unit 1 onto a vehicle wheel (not illustrated for simplicity). In some embodiments, mounting flange 8 may include an axially facing front surface 11 that extends radially from axis A and is interrupted by a plurality of through holes 10 arranged annularly about mounting flange 8.

It will be appreciated by a person of ordinary skill in the art that, in some embodiments, inner ring 4 may be stationary and outer ring 2 may rotate about an axis of rotation A of wheel hub unit 1. In such embodiments, outer ring 2 may include a spindle 7 formed on the outboard side of wheel hub unit 1.

In some embodiments, the rotating element, e.g., rotating inner ring 4, may be provided with a collar, e.g., a cylindrical guide sleeve portion 9, which extends axially from front surface 11 of mounting flange 8, at a side of wheel hub unit 1 radially opposite spindle 7. Collar 9 may include a radially outer peripheral side surface 12*e* and a radially inner peripheral side surface 12$i$. In some embodiments, collar 9 may be coaxial with spindle 7. In some embodiments, collar 9 may be perpendicular to front surface 11 and may also be cantilevered.

In some embodiments, collar 9 may receive a drum/brake disc and the wheel of a vehicle when wheel hub unit 1 is assembled with the vehicle. In some embodiments, the wheel may be fixed to mounting flange 8 using plurality of through holes 10.

In some embodiments, outer ring 2 and inner ring 4 may be coaxial with spindle 7 and collar 9, and all these elements may be coaxial with axis of symmetry A of wheel hub unit 1.

In some embodiments, a protective coating layer 13 may be applied to front surface 11 of mounting flange 8. A material of protective coating layer 13 may be, for example, a UV paint, e.g., a synthetic material polymerizable by UV rays, or a zinc flake paint, e.g., paint containing zinc and aluminum dispersed in an organic matrix. In some embodiments, protective coating layer 13 may also be applied to a radially outer surface 2$e$ of radially outer ring 2 and/or to side surfaces 12$e$ and 12$i$ of collar 9. FIG. 1 illustrates protective coating layer 13 with a thick line that is not drawn to scale, for the purpose of clear illustration. In application, protective coating layer 13 may be applied using a mixed air spray nozzle 14 and may be applied to a predetermined thickness. In some embodiments, the predetermined thickness of protective coating layer 13 may be between 30 and 40 microns to adequately protect wheel hub unit 1.

In some embodiments, front surface 11 of mounting flange 8 may include a central annular portion 11$a$ that houses plurality of through holes 10, whereby through holes 10 alternate annularly with solid portions of central annular portion 11$a$. In some embodiments, one or more markings 22, e.g., a QR code, a data matrix, a bar code, etc., may be made on one or more solid portions of central annular portion 11$a$ between adjacent through holes 10.

In some embodiments, an external, disc-shaped shield 20 may be used to shield annular portion 11$a$ of front surface 11 to protect one or more markings 22 during application of protective coating layer 13. Shield 20 may have a geometry that is identical or substantially identical to a geometry of central annular portion 11$a$ in order to protect markings 22 while allowing for other portions of front surface 11 to be coated with protective coating layer 13. By covering markings 22 with shield 20 during application of protective coating layer 13, malfunctions caused by protective coating layer 13 covering some or all of markings 22 and making makings 22 intelligible, which can result in malfunctions to markings 22, are prevented.

In some embodiment, magnetic components of wheel hub unit 1, such as an encoder 30, may be protected by a spindle 31, illustrated in FIG. 1 with a dotted line, that prevents protective coating layer 13 from coating encoder 30 during application.

In some embodiments, disc-shaped shield 20 may not be in contact with wheel hub unit 1, but may rather be positioned a predetermined axial distance "d" from central annular portion 11$a$ by means of a handling arm 21. Handling arm 21 may include an end 21$a$ attachable to disc-shaped shield 20. End 21$a$ and disc-shaped shield 20 may form a tool that can be replaced according to needs of a particular wheel hub unit, such as a wheel hub unit of different size and shape than wheel hub unit 1 described herein.

It will be appreciated by a person of ordinary skill in the art that, in some embodiments, handling arm 21 and disc-shaped shield 20 may be considered a separate unit to be used in production of a wheel hub unit, i.e., they can be positioned in any painting station where it is necessary to mask a surface of a wheel hub unit. In such embodiments, end 21$a$ of handling arm 21 may be integrally formed with disc-shaped shield 20 and interchangeable as an entire unit.

Predetermined axial distance "d" may take into account a position and a relative spatial orientation of spray nozzle 14 with respect to front surface 11 of mounting flange 8. In some embodiments, axial distance "d" and an angle of inclination a of spray nozzle 14, taken with respect to axis of symmetry A of wheel hub unit 1, may be such that an axis X of spray nozzle 14 creates a point of impact tangent to an area to be coated with protective coating spray 13, e.g., front surface 11. In some embodiments, axis X of spray nozzle 14 may be a central axis that passes through a center of spray nozzle 14 along which protective coating layer 13 is provided to wheel hub unit 1.

In some embodiments, disc-shaped shield 20 may be made of a material with sufficient structural resistance to resist displacement caused by pressure applied by spray nozzle 14 during application of protective coating layer 13, as well as be substantially flat with respect to front surface 11 of mounting flange 8. In some embodiments, disc-shaped shield 20 may be made of a metallic material, e.g., steel or aluminum, or a plastic material, such as polyamide polymers (PA6) or polytetrafluoroethylene (PFTE). A disc-shaped shield 20 made of a metallic material has further advantages of possessing resistance to solvents and other materials used as cleaning liquids, and to abrasion caused from removal of excess paint with a brush.

As discussed, the sizing, shape, and geometry of disc-shaped shield 20 are a function of the sizing, shape, and geometry of central portion 11$a$ where one or more markings 22 are located.

In some embodiments, a disc-shaped shield 20 made of a metallic material may have a minimum thickness of 0.5 mm, and a disc-shaped shield 20 made of a non-metallic material may have a minimum thickness of 1.0 mm. These dimensions ensure an adequate rigidity of disc-shaped shield 20 such that disc-shaped shield 20 does not bend during application of protective coating spray 13 and allow protective coating layer 13 to contact central portion 11$a$ and one or more markings 22. To limit the weight of disc-shaped shield 20, a maximum thickness thereof may not exceed 5 mm, whether disc-shaped shield 20 is made of a metallic material or a non-metallic material.

Finally, to further ensure coverage of central portion 11$a$ during application of protective coating layer 13, disc-shaped shield 20 may have a radial length equal to a radial length of an area to be protected by painting, e.g., central annular portion 11$a$, ±5%. This relationship ensures that plurality of markings 20 are protected from protective coating layer 13, which can include potential splashes during application of protective coating layer 13.

Figure 4:
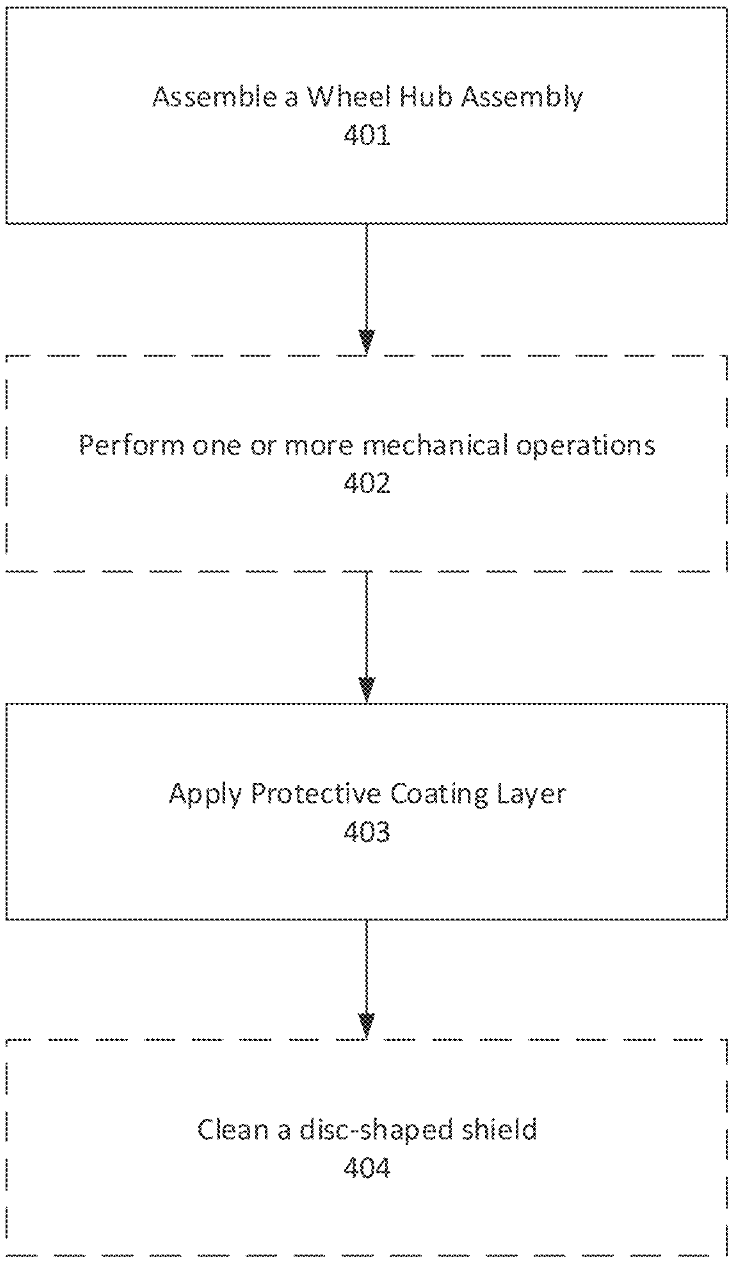
FIG. 4 is a flow chart of a method for applying a protective coating to a wheel hub unit according to exemplary embodiments of the present disclosure.

With reference to FIG. 4, a method 400 for manufacturing a wheel hub unit 1 may include step 401 of assembling a wheel hub unit, e.g., wheel hub unit 1. In some embodiments, assembling a wheel hub unit may include mounting wheel hub unit 1 on a motorized platform 16. Wheel hub unit 1 may be mounted on motorized platform 16 so that the rotating element of wheel hub unit 1, e.g., inner ring 4 or outer ring 2, may be driven idle. As explained with respect to step 403 below, motorized platform 16 may rotate wheel hub unit 1 about its axis of rotation A during application of protective coating layer 13 in order to achieve a uniform layer of protective coating layer 13 on wheel hub unit 1. In some embodiments, platform 16 may have a high stiffness to reduce vibrations resulting from rotation of wheel hub unit 1.

In some embodiments, wheel hub unit 1 may rest on spindle 31 by means of an edge 2*a* of radially outer ring 2 and may be centered on platform 16 by means of a radially internal surface 4*a* of radially inner ring 4. A rotation speed of spindle 31 may be adjusted to manage application of protective coating layer 13.

Optionally, at step 402, one or more mechanical operations may be performed on wheel hub unit 1. In some embodiments, step 402 may include treating front surface 11 of flange 8 to improve absorption of protective coating layer 13 applied at step 403. In some embodiments, one or more mechanical operations may include known mechanical operations, such as chip removal, surface finishing and lapping, etc. In some embodiments, performing one or more mechanical operations on wheel hub unit 1 may result in wheel hub unit 1 achieving an oscillation tolerance in the range of 10 μm to 15 μm to ensure that wheel hub unit 1 can withstand oscillations caused by rotating of wheel hub assembly about platform 16 during step 403 of method 400.

At step 403, a protective coating layer, e.g., protective coating layer 13, may be applied to wheel hub unit 1. In some embodiments, protective coating layer 13 may be applied to front surface 11 of mounting flange 8. Disc-shaped shield 20 may be positioned an axial distance "d" above central annular portion 11*a* during application of protective coating layer 13, thereby preventing application of protective coating layer 13 to central annular portion 11*a* of front surface 11. In some embodiments, disc-shaped shield 20 may be attached to or integral with an end 21*a* of mounting arm 21, which holds disc-shaped shield 20 in place during step 403.

In some embodiments, step 403 of applying a protective coating layer may include spraying protective coating layer 13 on front surface 11 using spray nozzle 14. Step 403 may further include rotating wheel hub unit 1 on platform 16 about axis of symmetry A in order to obtain a uniform layer of protective coating layer. In some embodiments, a position of spray nozzle 14 may be adjusted to spray a different surface of wheel hub unit 1 to which protective coating spray 13 is to be applied, e.g., outer surface 2*e* of outer ring 2, surface 12*e* and 12*i* of collar 9.

In this way, markings 20 and magnetic elements 30 that provide signals to sensor, e.g., ABS sensors, are shielded from protective coating layer 13 by disc-shaped shield 20 and spindle 31, respectively. Furthermore, configurations and methods according to exemplary embodiments of this disclosure eliminate burrs formed around disc-shaped shield 20.

In some embodiments, method 400 may further include an optional step 404 of cleaning disc-shaped shield 20. Cleaning disc-shaped shield 20 may include performing a washing treatment on disc-shaped shield 20 in a washing tank 18.

In addition to the exemplary embodiments of the disclosure described herein, it is to be understood that numerous other variants exist. It is also to be understood that such embodiments are exemplary only and limit neither the scope of the disclosure, its applications, nor its possible configurations. On the contrary, although the description herein allows a person of ordinary skill in the art to carry out the present disclosure, it may be understood that many variants of the components described are possible, without thereby departing from the scope of the disclosure, as defined in the attached claims, which are interpreted literally and/or according to their legal equivalents.

It should be noted that the use of particular terminology when describing certain features or embodiments of the disclosure should not be taken to imply that the terminology is being re-defined herein to be restricted to include any specific characteristics of the features or embodiments of the disclosure with which that terminology is associated. Terms and phrases used in this disclosure, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as" should be interpreted as "such as, without limitation"; the term "includes" should be interpreted as "includes but is not limited to"; the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

We claim:

1. A method for applying a protective coating to a wheel hub unit, comprising:

mounting the wheel hub unit on a platform; and applying a layer of the protective coating to a front surface of a mounting flange of the wheel hub unit, wherein a shield covers a central annular portion of the front surface to protect the central portion from the layer of protective coating;

wherein the shield is positioned a predetermined axial distance apart from the central annular portion of the front surface so as to noncontact the wheel hub unit when applying the layer of protective coating.

2. The method of claim 1, wherein the shield is disc-shaped and a mounting arm holds the disc-shaped shield at the predetermined axial distance from the front surface when applying the layer of the protective coating.

3. The method of claim 2, wherein the mounting arm is formed integral with the disc-shaped shield.

4. The method of claim 3, further comprising, prior to applying the layer of the protective coating, performing at least one mechanical operation on the front surface of the wheel hub unit.

5. The method of claim 4, wherein the disc-shaped shield comprises a radial length equal to a radial length of the central annular portion of the front surface.

6. The method of claim 5, wherein the radial width of the disc-shaped shield is within a range of 95% and 105% of the radial length of the central annular portion.

7. The method of claim 4, further comprising washing the disc-shaped shield in a washing tank.

8. The method of claim 2, wherein the disc-shaped shield is made of metallic material and the disc shaped shield comprises a thickness of between 0.5 mm and 5.0 mm.

9. The method of claim 2, wherein the disc-shaped shield is comprised of non-metallic material and comprises a thickness of between 1.0 mm and 5.0 mm.

10. The method of claim 2, wherein the central annular portion of the front surface of the mounting flange comprises one or more markings.

11. The method of claim 1, wherein applying the layer of protective coating further comprises:

applying the layer of protective coating to a radially outer surface of a radially outer element of the wheel hub unit; and applying the layer of protective coating to a radially outer surface and a radially inner surface of a collar of the wheel hub unit, wherein the collar projects axially from the front surface.

12. The method of claim 11, wherein:

applying the layer of protective coating to the radially outer surface of the radially outer element further comprises spraying the radially outer surface of the radially outer element with the protective coating, a point contact between the radially outer surface of the radially outer element and the protective coating being tangent to the radially outer surface of the radially outer element, and applying the layer of protective coating to the radially outer surface and the radially inner surface of the collar further comprises spraying the radially outer surface and the radially inner surface of the collar with the protective coating, a point of contact between the radially outer surface and the radially inner surface of the collar and the protective coating being tangent to the radially outer surface and the radially inner surface of the collar.

13. The method of claim 1, wherein applying the layer of protective coating further comprises spraying the front surface of the mounting flange with the protective coating such that a point of contact between the front surface and the protective coating is tangent to the front surface of the mounting flange.

* * * * *